May 14, 1963
G. A. LYON, JR
3,089,450
METHOD OF MAKING A BAKING PAN STRUCTURE
Original Filed Jan. 20, 1959
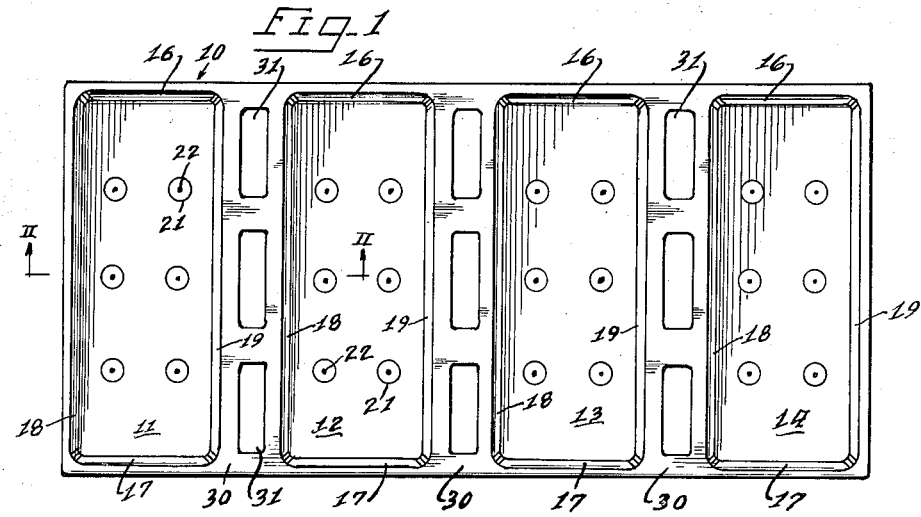
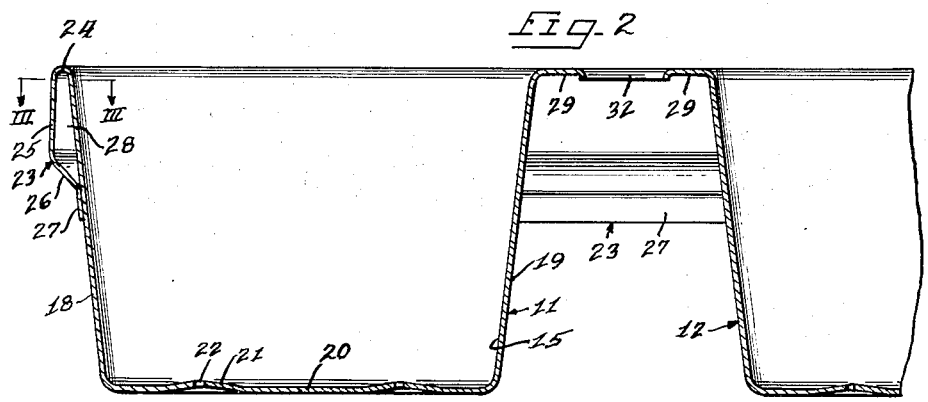
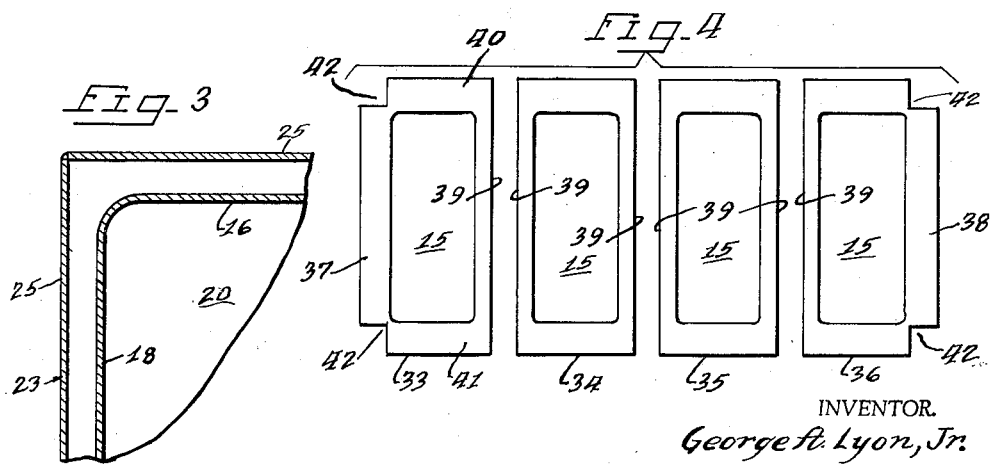
INVENTOR.
George A. Lyon, Jr.
BY
ATTORNEYS 3,089,450
METHOD OF MAKING A BAKING PAN
STRUCTURE
George A. Lyon, Jr., 13881 W. Chicago Blvd.,
Detroit, Mich.
Original application Jan. 20, 1959, Ser. No. 788,016, now Patent No. 3,040,735, dated June 26, 1962. Divided and this application Dec. 26, 1961, Ser. No. 161,855
5 Claims. (Cl. 113—120)

The present invention relates broadly to the art of baking, and is more particularly concerned with a unitary pan structure of proven utility in the baking of bread doughs and related materials.

Baking pans having a plurality of spaced dependent pan portions defining dough receiving cavities have heretofore been formed by provision on each pan portion of an outwardly extending flange around the periphery thereof, locating a reinforcing wire beneath the flange portion and against the outer walls of each pan portion so that opposite ends of the wire extended in spaced relation outwardly from one side wall of the pan portion, rolling the peripheral flange around the reinforcing wire, welding the ends of the reinforcing wire for one pan portion to the ends of the reinforcing wire of an adjacently located pan portion, and then welding a reinforcing band around the spaced pan portions as thus formed. As is apparent, the described manner of fabricating baking pans is a time consuming one, and suffers among other disadvantages from a high production cost.

It is accordingly an important aim of the present invention to provide a bread pan structure formed in a manner to eliminate the necessity for the reinforcing wire and reinforcing band associated with prior art structures.

Another object of this invention lies in the provision of a unitary bread pan structure comprising a plurality of spaced pan portions reinforced along opposite ends and along one side wall by a downwardly turned flange portion integral with the pan portion.

A further object of the present invention is to provide a baking pan structure comprising a sheet metal member shaped to define a plurality of spaced cavities to receive dough therein, each cavity being surrounded on at least two sides by a downwardly turned flange portion and connected to an adjacent cavity by an essentially flat flange portion to provide a unitary structure wherein the downwardly turned flange portion reinforces the structure and additionally frames the same.

A still further object of this invention lies in the provision of a method of forming baking pan structures, which comprises shaping a plurality of sheet metal blanks to provide a pan portion and an outwardly extending peripheral flange thereon, forming said flange on certain of said blanks along one side and opposite ends of the pan portion to provide therealong a downwardly turned portion, forming the flange on other of said blanks only on opposite ends to provide a downwardly turned portion, attaching the unformed flange of each pan portion to a corresponding flange on another pan portion to provide a plurality of spaced and connected pan portions, and securing the downwardly turned flange portion to the side and ends of the pan portions.

Other objects and advantages of the present invention will become more apparent during the course of the following description, particularly when taken in connection with the accompanying drawings.

In the drawings, wherein like numerals are employed to designate like parts throughout the same:

FIGURE 1 is a top plan view of a baking pan structure embodying the concepts of this invention;

FIGURE 2 is a vertical sectional view taken substantially along the line II—II of FIGURE 1;

FIGURE 3 is a fragmentary sectional view taken generally along the line III—III of FIGURE 2; and FIGURE 4 is an exploded plan view of partially formed sheet metal blanks prior to flange formation and attachment of the blanks one to the other to form the unitary pan structure of this invention.

Referring now to FIGURES 1 and 2, there is shown a unitary or integral pan structure designated generally by the numeral 10 and comprising a plurality of spaced and connected pan portions, four of which are provided in the exemplary embodiment shown and designated therein by the numerals 11, 12, 13 and 14. Each pan portion defines interiorly a dough receiving cavity 15, provided by a pair of inwardly sloping spaced end walls 16 and 17, spaced and inwardly sloping side walls 18 and 19, and a generally flat bottom wall 20, which may be inwardly dimpled as at 21 and apertured at 22 to improve the heat transfer to the dough in the cavity 15 during the baking operation. As indicated in FIGURE 1, the dimples 21 may be arranged in longitudinally and transversely extending rows.

The baking pan structure 10 may be formed of any suitable sheet metal, and a relatively light gauge stainless steel is presently preferred. While the embodiment of the invention shown in the drawings is in the form of a baking pan for bread doughs, it is of course appreciated that by minor modifications in the shape of the article the baking pan may be utilized for cake doughs and in the baking of other food materials. In addition, the walls defining the dough receiving cavity 15 may carry thereon an oxidized chromium plate coating to prevent sticking of the baked goods.

In accordance with the principles of this invention, there is eliminated the earlier mentioned reinforcing wire and band to rigidify the pan portions and to attach said pan portions one to the other. This is accomplished by a self-rimming flange structure integral with the pan portions and functioning in a dual manner to reinforce the pan portions and frame the same. As appears in the drawings, the baking pan structure 10 is framed about its periphery by flange means generally designated by the numeral 23 integral with opposite end walls 16 and 17 of each pan portion 11—14 and integral with side wall 18 of pan portion 11 and side wall 19 of pan portion 14. It is thus to be seen that all pan portions are framed at opposite ends by the flange means 23, while pan portions 11 and 14 at opposite ends of the structure 10 are framed also along one side wall.

The flange means 23 is formed in a manner to provide a smoothly curved rim portion 24 connecting with the noted walls of the pan portions, a generally flat leg portion 25 spaced from the pan portion walls, a generally flat and inwardly turned leg portion 26, and a generally flat downwardly extending leg portion 27 bearing against the noted end walls of the pan portions and secured thereto by spot-welding or related techniques. It will be observed that the flange means accordingly extends outwardly, downwardly, inwardly and downwardly and provides about the pan structure 10 a peripheral space or opening 28. It will further be observed that the rim portion 24 of the flange means 23 frames the entire structure, and that the leg portions 25, 26 and 27 of the flange means 23 reinforce or rigidify the pan portions a substantial distance downwardly along the walls thereof.

The intermediate pan portions 12 and 13 are further provided outwardly of their opposite side walls 18 and 19, and the pan portions 11 and 14 at opposite ends of the pan structure 10 are formed along a single or unframe side wall 19 and 18, respectively, with a generally flat flange portion 29. As will be noted hereinafter in connection with a preferred method of forming the pan structure 10, the relatively flat outwardly extending flange means on the pan portions are seam welded one to the other to provide a connecting flange 30 which embodies the pan portions 11—14 into the unitary or integral structure of FIGURE 1. As appears in FIGURE 2, the downwardly turned flange means 23 framing the structure 10 and reinforcing the same surrounds opposite ends of the flange means 30. While all applications may not render this a requirement, the flange means 30 may be provided with a plurality of spaced openings 31 to permit heat transfer through the structure 10 during the baking operation. In the event such openings 31 are employed, the flange portions surrounding said openings are preferably downwardly and inwardly turned as at 32 in FIGURE 2 for reinforcement purposes.

While persons skilled in the art may now conceive various methods of fabricating the novel article of this invention, a method which has provided particularly successful results to date includes the step of drawing the pan portions 11—14. In accordance with this method, generally rectangular blanks of stainless steel or other suitable material corresponding in number to the pan portions to be provided are utilized, the blanks from which the pan portions 11 and 14 at opposite ends of the structure 10 having a relatively greater width than the other blanks in order to provide sufficient metal from which the flange means 23 along the walls 18 and 19 can be formed. The blanks are then sequentially drawn in a suitable die under action of a male member or ram to produce essentially the configurations shown in FIGURE 4. As appears therein, partially formed blanks 33, 34, 35 and 36 are each provided with a dough receiving cavity 15, and the blanks 33 and 36 at opposite ends thereof may be observed to have relatively wide flange portions 37 and 38 which ultimately forms the flange means 23 at opposite ends of the resulting structure 10. The blanks 33—36 may at this time be welded along marginal portions 39, or as an alternative, the flange means 23 may first be formed by turning downwardly the flange portions 37 and 38 and flange portions 40 and 41 at opposite ends of the blanks 33, 34, 35 and 36. The flange means 23 may be formed by inverting the blanks 33—36, and by use of suitable die members, pressing the blanks downwardly to roll the flange portions 37, 38, 40 and 41 into essentially the configuration shown in FIGURE 2. To facilitate the flange formation on the blanks 33 and 36, the flange portions 37, 38, 40 and 41 may be triangularly notched as indicated at 42 in FIGURE 4. The leg portion 27 of the flange means 23 as thus formed may then be spot-welded at spaced locations to the walls of the pan portions 11—14, and after the blanks 33—36 have been welded together along the marginal portions 39, the bottom wall 20 of each pan portion may be dimpled and apertured as at 21 and 22, and the openings 31 formed in the flange means 30 connecting the pan portions one to another. The pan structure 10 is then cleaned and finished in accordance with customary techniques, and if desired, the walls of the pan portions defining the dough receiving cavity 15 may be given a chrome plate treatment which is then oxidized by passing the pan structure 10 through a heating step at a temperature approximating the baking temperature of bread, this oxidizing step necessarily being performed prior to any dough being located in the dough receiving cavities 15. The chromium oxide coating as thus provided has been found in actual practice to essentially entirely avoid any possibility of sticking of the dough to the walls defining the cavity 15 in subsequent bread or other baking operations.

It is to be seen from the foregoing that applicant has provided a novel baking pan structure wherein the pan portions are provided with flange means which functions in a dual manner to reinforce the pan portions and to frame the same. There is thus avoided the prior art requirement of reinforcing wire means around each pan portion, and the use of a band to join the pan portions one to the other. The pan structure 10 of this invention is readily formed by mass production techniques utilizing relatively low cost die structures, and the article of FIGURE 1 having the flange means shown is characterized by a strength and durability markedly greater than the known pan structures.

The present application for patent is a division of my copending application Serial No. 788,016, now U.S. Patent No. 3,040,735, which issued on June 26, 1962.

Various changes and modifications may of course be made in the structure disclosed, as well as in the practice of the described methods without departing from the novel concepts of the present invention.

I claim as my invention:

1. A method of forming baking pan structures, which comprises stamping a plurality of sheet metal blanks to provide a series of end and central sections each with a pan portion and on outwardly extending peripheral flange thereon, notching each of said end sections at two of its corners on one side of its pan portion, turning said flange on said end sections along one side and opposite ends of the pan portion to provide therealong a downwardly turned portion, turning the flange of said central sections only on opposite ends to provide a downwardly turned portion, welding an unformed flange of each pan portion to a corresponding flange on another pan portion to provide a plurality of spaced and connected pan portions, punching the welded flanges between the pan portions providing a series of transversely spaced flanged openings, and welding the downwardly turned flange portion to opposite ends of the pan portions intermediate the top and bottom thereof to provide a relatively narrow hollow bead portion strengthening the upper ends of the pan portions.

2. A method of forming baking pan structures, which comprises stamping a plurality of sheet metal blanks to provide a series of end and central sections each with a pan portion and an outwardly extending peripheral flange thereon, notching each of said end sections at two of its corners on one side of its pan portion, turning said flange on said end sections along one side and opposite ends of the pan portion to provide therealong a downwardly turned portion, turning the flange on said central sections only on opposite ends to provide a downwardly turned portion, welding an unformed flange of each pan portion to a corresponding flange on another pan portion to provide a plurality of spaced and connected pan portions, punching the bottoms of each of the pan portions providing them with apertured dimples protruding into the cavities defined by the pan portions, and welding the downwardly turned flange portion to opposite ends of the pan portions intermediate the top and bottom thereof to provide a relatively narrow hollow bead portion strengthening the upper ends of the pan portions.

3. A method of forming a baking pan structure, which comprises stamping a plurality of sheet metal blanks to provide a pan portion and an outwardly extending peripheral flange on each blank, turning said flange on a pair of said blanks along one end and along opposite sides of the pan portion to provide therealong a downwardly turned portion thereby forming these blanks into end sections, turning the flange on other of said blanks only on opposite sides to provide each side with a downwardly turned portion thereby forming these blanks into central sections, disposing the sections in end to end relation and attaching an unformed flange of each section to a corresponding flange on another section to unite the sections while leaving the pan portions spaced from one another at lower ends, and securing the downwardly turned flange portions on said sections to the respective opposing pan portions intermediate the top and bottom thereof to provide a relatively narrow hollow bead portion about the periphery of the united sections thereby strengthening the pan structure.

4. The method of forming a multi-compartment pan from sheet material, including the steps of stamping a plurality of blanks forming each with dished portions and peripheral flanges forming a series of end and central sections with only the end sections each having an end flange, notching each of said end sections at opposite corners of its end flanges, turning the peripheral flanges of all of said sections downwardly each into a hollow bead, positioning said sections in juxtaposed end to end relation with the central sections between the end sections and with edges of said central sections which are located between the side flanges being disposed in engagement with confronting edges on said end sections, and securing said edges of said sections together in end-to-end edgewise relation to form a pan having compartments disposed in side-by-side relation framed at its periphery by said hollow beads.

5. The method of claim 4 further characterized by welding end portions of the beads to the side walls of the pan portions.

References Cited in the file of this patent

UNITED STATES PATENTS

| | | |
|---|---|---|
| 2,122,537 | Pfeffer | July 5, 1938 |
| 2,352,501 | Slavicek | June 27, 1944 |